United States Patent [19]

Sidles et al.

[11] Patent Number: 5,102,604
[45] Date of Patent: Apr. 7, 1992

[54] METHOD FOR CURING FIBER REINFORCED THERMOSETTS OR THERMOPLASTICS

[75] Inventors: James Sidles, Richfield; Brian Sarvas, Lorain, both of Ohio

[73] Assignee: The B.F. Goodrich Company, Brecksville, Ohio

[21] Appl. No.: 524,628

[22] Filed: May 17, 1990

[51] Int. Cl.$^5$ ............................................. B29C 43/18
[52] U.S. Cl. ................................. 264/257; 264/258; 264/313; 264/324; 264/325; 425/405.2
[58] Field of Search ............... 264/236, 257, 258, 319, 264/320, 322, 324, 325, 313; 425/405.1, 405.2

[56] References Cited

U.S. PATENT DOCUMENTS

| | | | |
|---|---|---|---|
| 605,223 | 6/1898 | Gartrell | 72/63 |
| 3,249,964 | 5/1966 | Shaler | 425/405.2 |
| 3,344,209 | 9/1967 | Hague et al. | 264/125 |
| 3,363,037 | 1/1968 | Levey et al. | 264/405.2 |
| 3,701,190 | 10/1972 | Stone, Jr. | 29/156.8 |
| 4,023,966 | 5/1977 | Loersch et al. | 264/332 |
| 4,041,123 | 8/1977 | Lange et al. | 264/332 |
| 4,068,704 | 1/1978 | Wittmoser | 264/405.2 |
| 4,155,795 | 5/1979 | Torbet | 264/84 |
| 4,188,811 | 2/1980 | Brimm | 72/63 |
| 4,243,368 | 1/1981 | Garabedian | 425/405.1 |
| 4,264,556 | 4/1981 | Kumar | 425/405.2 |
| 4,428,906 | 1/1984 | Razmus | 425/78 |
| 4,656,002 | 4/1987 | Lizenby et al. | 425/405.2 |
| 4,738,610 | 4/1988 | Chiang et al. | 425/78 |
| 4,940,563 | 7/1990 | Kromrey | 264/257 |
| 4,983,341 | 1/1991 | Kromrey | 264/257 |
| 4,983,345 | 1/1991 | Kromrey | 264/405.2 |

FOREIGN PATENT DOCUMENTS 2134168 5/1971 Fed. Rep. of Germany ...... 264/320

Primary Examiner—Jay H. Woo
Assistant Examiner—Jeremiah F. Durkin
Attorney, Agent, or Firm—Daniel J. Hudak; Nestor W. Shust

[57] ABSTRACT

A process for curing a polymeric article formed from a fiber material inpregnated with uncured phenolics, unsaturated polyesters, epoxides, or silicones. The process involves placing the uncured article into a non-gas tight pressure chamber, packing the chamber with lubricated beads, and heating the article under pressure. Additionally, fiber-reinforced thermoplastics may be heat shaped in the presence or absence of a mold.

10 Claims, 1 Drawing Sheet

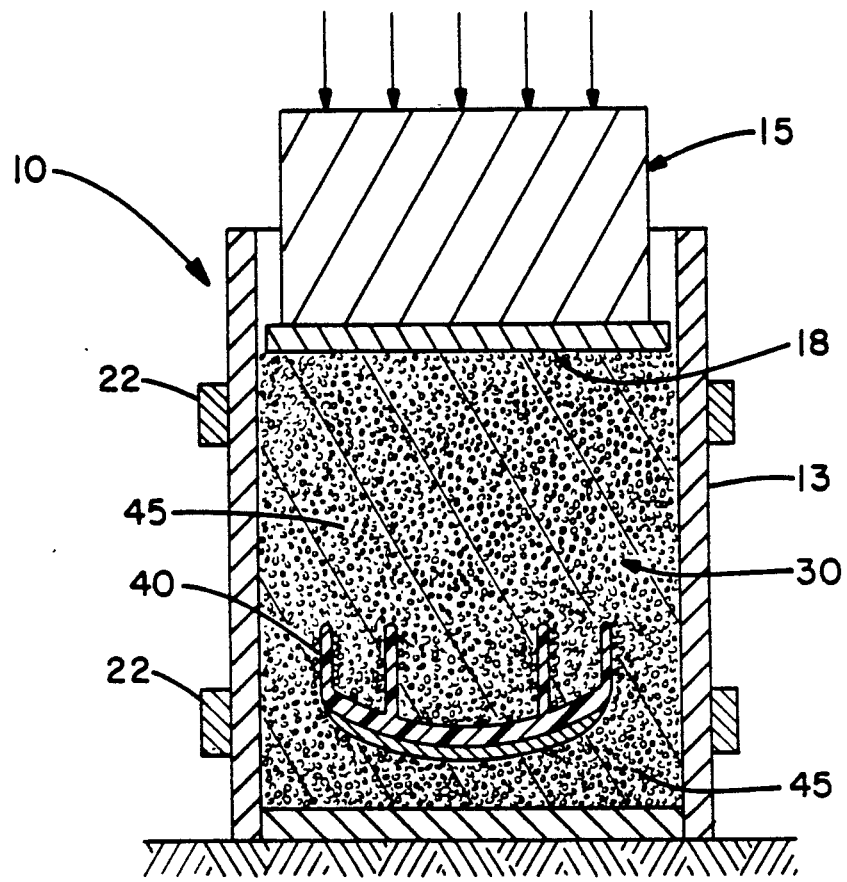
FIG.-1
FIG.-2
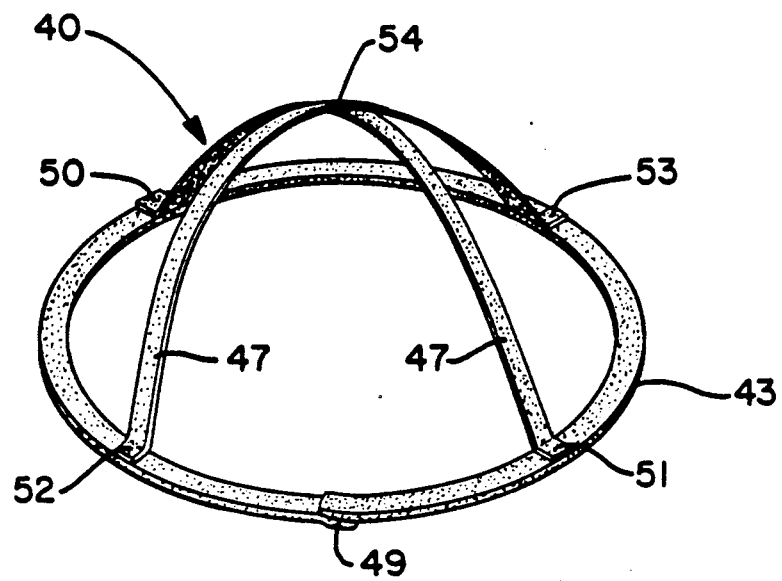

METHOD FOR CURING FIBER REINFORCED THERMOSETTS OR THERMOPLASTICS

FIELD OF THE INVENTION

This invention relates generally to a molded article and a process for curing fiber-reinforced thermosets or for heat shaping fiber-reinforced thermoplastics in the presence or absence of a mold. A workpiece to be cured or heat-shaped is placed in a pressure chamber and packed with lubricated beads. The beads act both as a pressure transmission device and as a molding device in that the beads help the workpiece to maintain structural integrity until the workpiece is cured or heat-shaped.

BACKGROUND OF THE INVENTION

U.S. Pat. No. 605,223 (J. H. Gartrell, June 7, 1898), relates to a pressing apparatus for pressing sheet tin or its alloys or gold, platinum or other metal or alloy or vulcanite to fit a model of the mouth. A model is placed inside a metal casting fitted to receive a metal plunger. Fine gunshot or very small steel balls about 1/16" in diameter are then poured into the casting until the model and plate are surrounded and covered. A metal plunger is placed over the shot and the apparatus is then put in a screw press. The contents may be heated by placing the apparatus into boiling water.

U.S. Pat. No. 4,188,811 (Brimm, Feb. 19, 1980), relates to the shaping of an article such as turbine and compressor blades to either the original or new configurations. The articles are placed against the heated die surface which either duplicates the original weight contour or provides a new desired shape. After the blade is installed, it is covered with a heat resistant or refractory material. A pressure transferring medium such as heat-resistant glass beads are added and the blade is shaped under heat and pressure.

SUMMARY OF THE INVENTION

This invention is directed to a molded article and a process for curing or otherwise heat-shaping glass/graphite fiber-reinforced prepreg that has been shaped or molded. An article once shaped or molded is placed in a pressure chamber and the pressure chamber is packed with lubricated beads. The application of both heat and pressure to the shaped or molded article causes the shaped or molded article to become rigid. If a thermoset is used, the rigidity is due to cure or if a thermoplastic is used, the rigidity is imparted due to the loss in molecular mobility because of the reduction in temperature.

BRIEF DESCRIPTION OF THE DRAWINGS

FIG. 1 is a front view of the pressure chamber; and
FIG. 2 is an object cured without benefit of a mold.

DETAILED DESCRIPTION OF THE INVENTION

In the practice of this invention, articles in or out of a mold can be cured or heat-shaped in a pressure chamber. The starting material for the article is a fiber material that has embedded therein a thermoset or thermoplastic polymeric matrix. Alternatively, the starting material is a thermoset or thermoplastic material having fibers embedded within the polymer matrix. The material is cut and shaped or molded into an article. The article is placed in a pressure chamber and beads are packed around and over the article. As the article is heated under pressure, cure, for a thermoset fiber material, occurs along with debulking. Debulking is the process by which an uncured article shrinks as cure occurs. That is, as crosslinking occurs in a thermosetting resin, the by-products thus formed leave the cured article. This causes the cured article to be lighter in weight and smaller in size. No cure occurs for a thermoplastic fiber, but rather the thermoplastic fiber-shaped article is further shaped by heat.

Depending upon the size of the mold of the finished part, the starting material is cut into pieces of various sizes and shapes. The pieces may be rectangular, triangular, circular, trapezoidal, or even irregular in shape. The strips are contoured on a mold and the molded part 40 still in the mold is placed within a pressure chamber 10 containing beads 45. The pressure chamber has a cavity 30 and a housing 13. Additional beads are then packed around and over the mold. The beads are spherical and have a diameter of from about 0.1 to about 1 mm, preferably from about 0.25 to about 0.75 mm, and most preferably from about 0.4 to about 0.6 mm. Further, the beads are coated with a lubricant comprising a silicon oil, especially polydimethylsiloxane.

The beads, which are nonporous, function both as a pressure-transferring medium and a support medium for the part to be cured, if a thermoset; or heat transformed, if a thermoplastic. The average particle size distribution of the beads is relatively narrow. Beads at a particle size of 0.6 mm have a tolerance of $\pm 0.1$ mm which means there is a statistical distribution of beads having a particle size of from about 0.5 mm to about 0.7 mm (25 to 35 U.S. mesh). Beads that are too large do not give proper support to an article during cure or heat transformation since large beads do not contour to an article as do small beads. Further, large beads cause an article to have a "pebbled" surface.

The beads are of metal, ceramic or glass. It is important regardless of the composition of the beads that they do not soften within the temperature parameters of this invention. It is preferable that the beads are made of glass.

After the cavity 30 is packed with the glass beads 45, pressure plate 18, mounted with a piston 15, is put into position at the top of the pressure chamber 10 and the contents are heated under pressure and heat by means of heater bands 22. After the pressure chamber 10 is loaded, it is placed between platens of a press which is how the pressure is generated within the pressure chamber. The temperature of the pressure chamber is dependant upon the material selected to be cured. For glass fiber epoxy, the temperature is from about 150° F. to about 500° F., preferably from about 150° F. to about 400° F., and most preferably from about 150° F. to about 300° F. For a phenolic prepreg material, the temperature is from about 200° F. to about 500° F., preferably from about 200° F. to about 400° F., and most preferably from about 250° F. to about 400° F. For glass fiber epoxy or phenolic prepreg material, the pressure is from about 30–5,000 pounds per square inch, preferably 70–2,000 pounds per square inch, and most preferably from about 80–500 pounds per square inch.

It is important to note that the pressure chamber is not a sealed gas system. The dimensions of pressure plate 18 are such that the edges of the pressure plate are not in contact with the internal housing. The importance of this gap or airway is that during cure, any gaseous by-products of the cure as well as trapped gases within the starting material, are allowed to escape from the pressure chamber. The pressure chamber thus is not a sealed gas system, but rather a sealed bead system. The beads are sealed within the cavity, but formed gases are permitted to escape.

The prepreg starting material is a material form consisting of continuous unidirectional or woven fibers precoated with a controlled quantity of an uncured catalyzed resin formulation. The prepreg is obtainable in either roll or sheet form.

The principal fibers used in prepreg are aramid, carbon, and glass, with epoxy, bismaleimide, phenolic, or polyamide resin as the matrix. However, virtually any fiber/matrix combination can be used.

The predominate methods of prepreg production are via hot melt or by solvent impregnation. In the hot melt method, a film (or films) of resin at the controlled weight is impregnated onto the fiber form using heat and pressure. For solvent impregnation, the fiber form is passed through a solution of formulated resin, calendered to produce the required resin content, and then sent through a heated oven to remove the solvent.

It is envisioned within the scope of this invention that the material used for molded or unmolded applications comprises thermoset or thermoplastic particles that have been impregnated into a fabric material. Examples of such materials include thermoset polymers, phenolic resins, bismaleimides, epoxies, thermoplastic polymers, polyphenylene sulfide, polyether ketone, polyetherether ketone, nylon, polybutylene, polyethylene, polypropylene and styrene-acrylonitrile. More detailed descriptions are included below as illustrations of useful matrix materials. These descriptions are not meant to be limiting.

A thermoset polymer is a polymer that solidifies or "sets" irreversibly when heated. This property is usually associated with a crosslinking reaction of the molecular constituents induced by heat. Thermoset polymers are phenolics, alkyds, amino resins, polyesters, epoxides and silicones.

Typically various thermoset polymers crosslink at from about 200°-700° F., preferably 200°-500° F., and most preferably at from about 200°-400° F. The pressure is from about 30-5,000 pounds per square inch, preferably 70-2,000 pounds per square inch, and most preferably from about 80-500 pounds per square inch.

Examples of phenolic resins having utility in this application are the reaction product of phenol and formaldehyde. The reaction product is of the novolac or resole formation. For a discussion of the synthesis and properties of phenolic resins, see *Phenolic Resins,* Knop and Pilato, Springer-Verlag, pages 91–102 (1985), the disclosure of which is herein incorporated by reference. The two formations are outlined below.

NOVOLAC FORMATION

In the presence of acid catalysts and with the mole ratio of formaldehyde to phenol less than 1, the benzenemethanol derivatives condense with phenol to form first dihydroxydiphenylmethane:

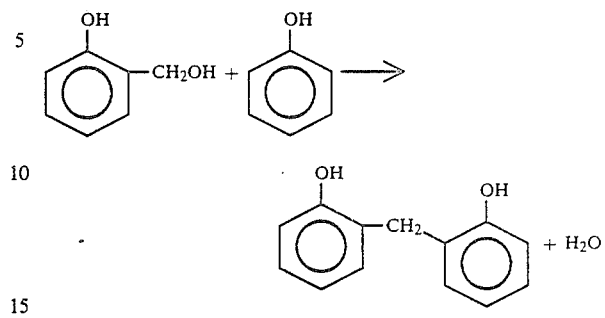

and on further condensation and methylene bridge formation, fusible and soluble linear low polymers called novolacs with the structure

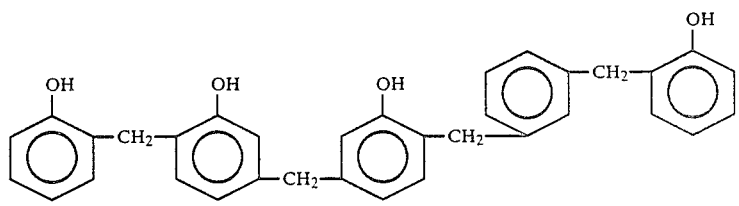

etc., where ortho and para links occur at random. Molecular weights may range as high as 1,000, corresponding to about 10 phenyl moieties. These materials do not themselves react further to give crosslinked resins, but must be reacted with more formaldehyde to raise its mole ratio to phenol above unity.

RESOLE FORMULATION

In the presence of alkaline catalysts and with more formaldehyde the benzenemethanol phenols can condense either to methylene linkages or to ether linkages. In the latter case, subsequent loss of formaldehyde may occur with methylene bridge formation.

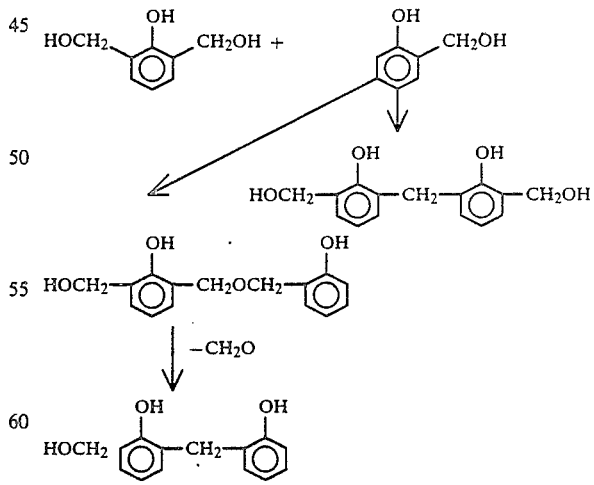

Products of this type, soluble and fusible but containing alcohol groups, are called resoles. If the reactions leading to their formation are carried further, large numbers of phenolic nuclei can condense to give network formation.

The formation of resoles and novolacs respectively leads to the production of phenolic resins by one-stage and two-stage processes.

In a production of a one-stage phenolic resin, all the necessary reactants for the final polymer (phenol, formaldehyde and catalyst) are charged into a resin kettle and reacted together. The ratio of formaldehyde to phenol is about 1.25:1, and an alkaline catalyst is used.

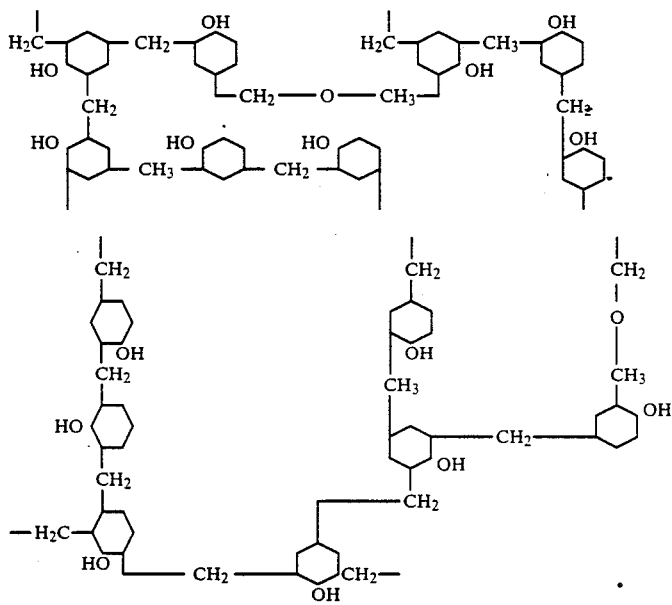

Two-stage resins resins are made with an acid catalyst and only part of the necessary formaldehyde is added to the kettle producing a mole ratio of approximately 0.8:1. The rest is added later as hexamethylenetetramine (HMTA)

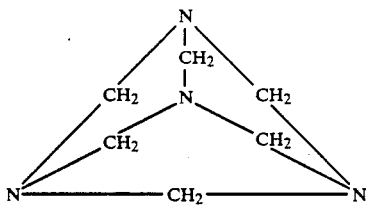

which decomposes in the final curing step with heat and moisture present to yield formaldehyde and ammonia which acts as a catalyst for curing.

The procedures for one and two-stage resins are similar and the same equipment is used for both. The reaction is exothermic and cooling is required. A formation of a resole or a novolac is evidenced by an increase in viscosity. Water is then driven off under vacuum and a thermoplastic A-stage resin, soluble in organic solvents, remains. This material is dumped from the kettle, cooled, and ground to a fine powder.

At this point, fillers, colorants, lubricants, and (if a two-stage resin) enough hexamethylenetetramine to give a final formaldehyde:phenol mole ratio of 1.5:1 are added. The mixture is rolled on heated mixing rolls where the reactions are carried further, to the point where the resin is in the B-stage, nearly insoluble in organic solvents, but still fusible under heat and pressure. The resin is then cooled and cut into final form. The C-stage, the final, infusible, crosslinked polymer, is reached on subsequent fabrication, for example by molding. Numerous other types of phenolic resins known to the art and in the literature may also be employed in the practice of this invention.

Bismaleimides (BMI's) are generally prepared by the condensation reaction of a diamine with maleic anhydride. A typical BMI based on methylene dianiline (MDA) is shown below as Formula I:

FORMULA I

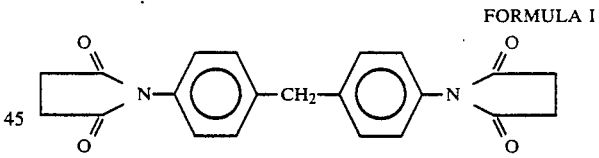

BMI's are very reactive due to their unsaturated nature and can homopolymerize or react with other coreactants through the end double-barring groups. The homopolymerized materials are relatively brittle compared to the polymers as a result of copolymerization reactions. Traditionally, aromatic amines have been used as curing materials for BMI's, but the resulting polymers tend to be brittle in nature. Another class of coreactants allyl phenols have been found to result in better processing as well as superior performance characteristics.

Epoxies are a broad family of materials containing a reactive functional group (oxirane ring) in their molecular structure. These resins are unique among thermosetting resins because of their very low shrinkage during polymerization or curing.

The most widely used epoxy resins are based upon the reaction of bisphenol A (bis A) and epichlorohydrin producing the diglycidyl ether of bisphenol A (DGEBA). The general structure of this basic resin is shown as Formula II.

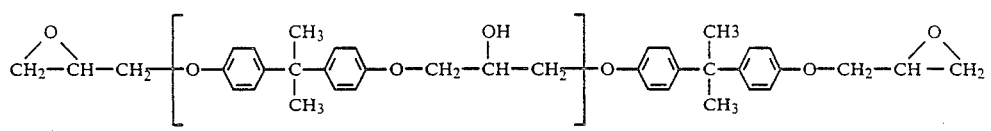

FORMULA II

Epoxy resins of differing molecular weight can be prepared by the reaction of DGEBA with bisphenol A. The molecular weight of the epoxy resin generally affects the softening point, melt viscosity, and solution viscosity of the epoxy resin, as well as the physical and chemical properties of the cured coatings prepared from them. It is often desirable to use as high a molecular weight as practical to provide a product of sufficient toughness and flexibility. High molecular weight resins are generally prepared by a fusion reaction of DGEBA, bisphenol A and an advancement catalyst.

Other epoxy resins are novolac epoxies, multifunctional epoxies, and multifunctional amine-based epoxy resins. Novolac epoxies are usually prepared by reacting phenol or a substituted phenol with formaldehyde and then reacting that product with epichlorohydrin to obtain Formula III.

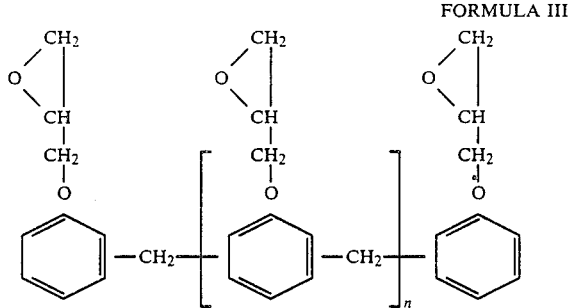

FORMULA III

Each repeating unit ("n" value) contains an epoxy group. Thus, the percent epoxide in the resin does not change with change in "n" value or molecular weight. When the "n" value is greater than 3 to 4, the epoxide is a solid at room temperature.

Epoxide novolacs can be cured to a high crosslinked density and are used where good elevated temperature properties or improved chemical resistance is needed.

Multifunctional epoxies are a broad class of materials that contain two or more epoxy groups of the same molecule as in Formula IV

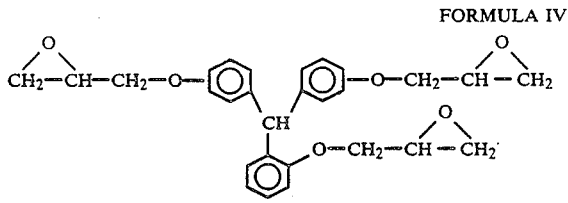

FORMULA IV

Other types of multifunctional epoxy resins are based on amines, where amine hydrogens are epoxidized as in Formula V

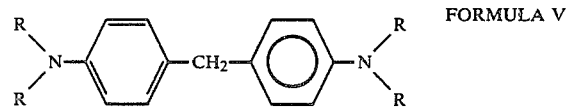

FORMULA V

-continued

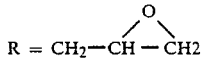

$R = CH_2-CH-CH_2$

Brominated epoxies containing from 15 to 50 percent bromine usually are produced by reacting tetrabromobisphenol A with a DGEBA-type resin. The brominated resins are used for their fire-retardant properties primarily in electrical laminates.

Polyurethanes (PUR's) generally are formed by mixing two primary ingredients during processing. Of the most commonly used PUR's, the two ingredients are a polyisocyanate and a polyol. A great many combinations of polyisocyanates and polyols, as well as other ingredients and reactive chemicals, are available. This great scope of compounding makes it possible to design PUR's for a wide range of end use properties.

Within the polyisocyanates, two types are predominantly used to make PUR's: diphenyl methane diisocyanate monomer (MDI) and its derivatives, and toluene diisocyanate (TDI) and its derivatives.

Two basic types of polyols are used in the PUR system: polyesters and polyethers.

Other thermoset resins having utility in this invention are the alkyds, unsaturated polyesters, and silicones.

A thermoplastic polymer is a polymer that softens when exposed to heat and retains its original condition when cooled to room temperature. Examples of thermoplastic polymers are polyvinyl chloride, chlorinated polyvinyl chloride, nylons, fluorocarbons, polyethylene, polystyrene, polypropylene, and acrylic resins, polyether ketone, polyetherether ketone, polyamide-imide, styrene-acrylonitrile, polybutadiene and polyphenylene sulfide.

The thermoplastic polymeric articles are shaped in a pressure chamber at from about 120°-1,000° F., preferably 200°-700° F., and most preferably at from about 200°-400° F. The pressure is from about 100-5,000 pounds per square inch, preferably 120-1,000 pounds per square inch, and most preferably 150-800 pounds per square inch.

Polyphenylene sulfide is a crystalline, aromatic polymer in which recurring benzene rings are parasubstituted with sulfur atom links.

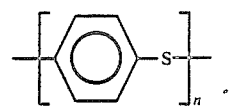

Polyether ketone (PEK) is a partially crystalline aromatic material composed of aryl repeating units linked by oxygen and carbonyl groups.

Polyetherether ketone (PEEK) polymer is made by condensation polymerization in an aromatic solvent. Its wholly aromatic structure (Formula VI) contributes to its high temperature performance.

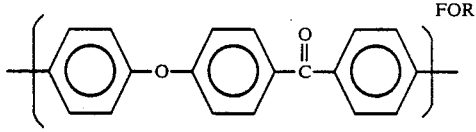

FORMULA VI

Nylons are synthetic polymers that contain an amide group, —CONH— as a recurring part of the chain. Nylons are made from (a) diamines and dibasic acids, (b) omega amino acids, or (c) lactams.

Nylons are identified by numbers corresponding to the number of carbon atoms in the monomers [diamine first for (a)]. Nylon 6/6 is the reaction product of hexamethylene diamine and adipic acid, poly(hexamethylene) adipamid, $H[NH(CH_2)_6NHCO(CH_2)_4CO]_n$ OH; Nylon 11, poly(11-aminolindecanoic acid), is prepared from 11-aminolindecanoic acid; and Nylon 6, polycaprolactam, is prepared from Epsilon-caprolactam. Nylon 6/12 is made from hexamethylenediamine and the 2 carbon acid, dodecanedioic acid, or $HOOC(CH_2)_{10}COOH$. The molecular weights of nylons range from 11,000 to 34,000. They usually are semi-crystalline polymers with melting points in the range of 350° to 570° F.

Other commercial nylons that may be useful in the practice of this invention are 6/9, 6/10, 10, 12, and the recently introduced 4/6 and 12/12. The more carbon atoms, that is, the lower the concentration of amide groups, the lower the melting point, with the proviso that nylons in which the amides are separated by an even number of carbon atoms melt higher than those of similar amide concentration with an odd number of carbon atoms.

Polybutylene resins are semi-crystalline polyolefin thermoplastics based on poly(1-butene) and include homopolymers and a series of poly(1-butene/ethylene) copolymers. Polybutylene (PB) is manufactured via stereospecific Ziegler-Natta polymerization of 1-butene monomer.

Linear polyethylene (PE), which encompasses ultra low density (ULDPE), linear low density (LLDPE), high density (HDPE), high molecular weight-high density (HMW-HDPE), and ultra high molecular weight (UHMW-PE), is polymerized in reactors maintained at pressures far lower than those required in reactors used for making branched polyethylene. In making branched PE, the critical polymer parameter of density which, in a sense, describes the closeness and regularity (or crystallinity) of the packing of the long polymer backbones, is varied by means of changes in reactor pressure and heat. Linear PE density, on the other hand, varies with the quantity of comonomer used with ethylene. The comonomer forms short-chained branches along the ethylene backbone, and since the branches create separations between the polymer backbone, the greater the quantity of comonomer, the lower the density of the polymer.

Polypropylene (PP) in an isotactic is a stereospecific polymer in which the propylene units are attached in a head-to-tail fashion and the methyl groups are aligned on the same side of the polymer backbone.

Isotactic PP is produced by polymerizing polypropylene with organometallic stereospecific catalysts (Ziegler-Natta).

Styrene-acrylonitrile (SAN) resins are random amorphous linear copolymers that can be produced by emulsion, suspension, or continuous mass polymerization methods. Inherent properties are controlled primarily by variations in molecular weight and acrylonitrile content; increasing acrylonitrile content and molecular weight generally results in property improvements.

The following examples illustrate the application of this invention for the curing of a thermoset polymer material under heat and pressure.

EXAMPLE 1

Pieces of a glass fiber epoxy under the tradename "Fiberite" glass fiber epoxy impregnated material available as MXB7781/7701 were used as the starting material. The pieces were cut triangular in shape resembling an isosceles triangle having a 4-inch base and 5-inch height. These pieces were placed within a ceramic mold having an upper diameter of 5.25 inches that is 3 inches deep and is hemispherical in shape. The triangular pieces were laid within the mold such that the 4-inch base resided at the rim of the mold. As each triangular piece was laid down, the previous piece was overlapped by about one-half the size of that piece. Pieces were laid until the mold had a ten layer thickness of glass fiber epoxy material. The excess material was trimmed at the rim of the mold to a flush appearance. The mold was then placed into the cavity of a pressure chamber that contained about three inches of 0.5 mm diameter glass beads lubricated with polydimethylsiloxane. The mold was inserted into the bed of beads to a depth of about 1.5 inches. Additional glass beads were added to the cavity totally covering the mold to within about 5 inches of the top of the pressure chamber. A pressure plate, which was not gas-tight, was placed on top of the beads and the piston put in place over the pressure plate. The chamber was heated to 250° F. at a pressure of about 150 psi and held at this temperature and pressure for 3 hours to effect cure. The pressure within the chamber was returned to normal and the chamber with contents were allowed to cool overnight and the glass beads were vacuumed out of the chamber. The crucible mold was retrieved and the cured epoxy material demolded hot to yield a cured rigid piece. The beads that were adhered to the piece were removed by using a thin-bladed instrument such as a knife. The formed piece was degreased with toluene.

The following example illustrates how the present invention can be utilized to heat-cure a three-dimensional object without the use of a mold.

EXAMPLE 2

Phenolic prepreg material at room temperature was cut into about 1-inch strips. A first strip 43 about 20 inches long was shaped into a circle and the 1-inch ends were tacked together. This material is tacky to the touch and easily adheres to itself. Two 15-inch strips 47 at 1-inch wide were applied to the 20-inch strip in the following manner: One end of the first 15-inch strip was tacked at 50 to the interior side of the 20-inch strip and the other end of the first 15-inch strip was tacked at 51 to the interior side of the 20-inch strip at an angle 180 degrees away from the first tacking. The second 15-inch strip 47 was tacked at 52 to the interior side of the 20-inch strip at an angle 90 degrees of the tacking of either end of the first 15-inch strip. The remaining end of the second 15-inch strip was tacked at 53 at an angle 180 degrees away from the first tacking of the second 15-inch strip. Further, the remaining end of the second 15-inch strip was tacked 90 degrees away from the tacking of either end of the first strip. The apex or point where the first and second 15-inch strips intersect was also tacked at 54.

Once this object 40 was made, it was frozen to about 0° F. prior to heat pressure cure to give the object structural integrity.

The frozen object 40 was placed into the pressure chamber containing about a two-inch level of glass beads at 0.5 mm diameter that were coated with polydimethylsiloxane. The coated beads were also frozen to about 0° F. and were packed around, inside, and over the frozen object. The pressure chamber was heated to about 250° F. by heater bands 22 and pressurized to 150 psi by piston 15 and non-gas-tight pressure plate 18 and held at this temperature and pressure for about 2.5 hours. The pressure was removed and the contents cooled and the glass beads vacuumed out as in Example 1. Any glass beads adhering to the cured object were removed with a thin-bladed instrument. The cured object was degreased with toluene.

The following examples illustrate the application of this invention for the shaping of a fiber material impregnated with a thermoplastic polymer under heat and pressure. The individual pieces that make up the finished article are heated in order to be pliable. The pliability temperature is at least about 200° F. and preferably at least about 400° F.

EXAMPLE 3

Pieces of a thermoplastic-impregnated fiber material, available from Phillips Petroleum Company under the name Ryton ®, glass fiber impregnated with polyphenylene sulfide identifed chiefly as polyphenylene sulfide, are used as the starting material. The pieces are cut triangular in shape resembling an isosceles triangle having a 4-inch base and 5-inch height. In order for the pieces to be pliable they are heated in an oven at about 200° F. These pieces are placed within a ceramic mold having an upper diameter of 5.25 inches that is 3 inches deep and is hemispherical in shape. The triangular pieces are laid within the mold such that the 4-inch base resides at the rim of the mold. As each triangular piece is laid down, the previous piece is overlapped by about one-half the size of that piece. Pieces are laid until the mold has a ten layer thickness of thermoplastic material. The excess material is trimmed at the rim of the mold to a flush appearance. The mold is then placed into the cavity of a pressure chamber that contains about 3 inches of 0.5 mm diameter glass beads lubricated with polydimethylsiloxane. The mold is inserted into the bed of beads to a depth of about 1.5 inches. Additional glass beads are added to the cavity totally covering the mold to within about 5 inches of the top of the pressure chamber. A pressure plate which is not gas-tight is placed on top of the beads and the piston put in place over the pressure plate. The chamber is heated to 500° F. at a pressure of about 200 psi and is held at this temperature and pressure for about 15 minutes to effect shaping. The pressure within the chamber is maintained while the contents are allowed to cool to at least below 120° F. for handling purposes. The pressure is returned to normal and the glass beads are vacuumed out of the chamber. The crucible mold is retrieved and the cured epoxy material de-molded at a temperature below the Tg of the thermoplastic polymer to yield a newly shaped rigid piece. The beads that adhere to the piece are removed by using a thin-bladed instrument such as a knife. The formed piece is degreased with toluene.

The following example illustrates how the present invention can be utilized to heat-shape a three-dimensional object without the use of a mold.

EXAMPLE 4

Pieces of a thermoplastic-impregnated fiber material, available from Phillips Petroleum Company under the name Ryton ®, glass fiber impregnated with polyphenylene sulfide identified chiefly as polyphenylene sulfide, are used as the starting material. The fiber is cut into 1-inch strips and the strips are placed in an oven at 200° F. in order for the strip to be pliable. Hot air from a hot-air gun is directed over the strips as the article is being shaped in order to keep the strips pliable and tacky. A first strip 43 about 20 inches long is shaped into a circle and the 1-inch ends are tacked together. This material is tacky to the touch and easily adheres to itself. Two 15-inch strips 47 at 1-inch wide were applied to the 20-inch strip in the following manner: One end of the first 15-inch strip is tacked at 50 to the interior side of the 20-inch strip and the other end of the first 15-inch strip is tacked at 51 to the interior side of the 20-inch strip at an angle 180 degrees away from the first tacking. The second 15-inch strip 47 is tacked at 52 to the interior side of the 20-inch strip at an angle 90 degrees of the tacking of either end of the first 15-inch strip. The remaining end of the second 15-inch strip is tacked at 53 at an angle 180 degrees away from the first tacking of the second 15-inch strip. Further, the remaining end of the second 15-inch strip is tacked 90 degrees away from the tacking of either end of the first strip. The apex or point where the first and second 15-inch- strips intersect is also tacked at 54.

Once this object 40 is made, it is permitted to cool to about room temperature to give the object structural integrity.

The rigid object 40 is placed into the pressure chamber containing about a two-inch level of glass beads at 0.5 mm diameter that are coated with polydimethylsiloxane. The coated beads are packed around, inside, and over the rigid object. The pressure chamber is heated to about 500° F. by heater bands 22 and pressurized to 150 psi by piston 15 and non-gas-tight pressure plate 18 and held at this temperature and pressure for about 15 minutes to effect shaping. The pressure within the chamber is maintained while the contents are cooled to at least below 120° F. for handling purposes. The pressure is returned to normal and the glass beads vacuumed out. Any glass beads adhering to the cured object are removed with a thin-bladed instrument. The newly shaped object is degreased with toluene.

While in accordance with the Patent Statutes, the best mode and preferred embodiment has been set forth, the scope of the invention is not limited thereto, but rather by the scope of the attached claims.

What is claimed is:

1. A process for curing a thermoset polymer article, comprising:
   forming a fiber material impregnated with a thermoset resin selected from the group consisting uncured phenolics, unsaturated polyesters, epoxides or silicones into the uncured article;
   placing the uncured article within a cavity of a non-gas-tight pressure chamber;
   packing lubricated beads under, around, and over the uncured article, wherein the beads are selected from the group consisting of metal, ceramic or glass, and wherein said beads act to transfer pressure and act to support said article; and curing the uncured article by applying heat at a temperature from about 200° to about 700° F. and by applying pressure of from about 30 to about 5,000 pounds per square inch.

2. The process of claim 1 wherein the beads are of glass and have a diameter of from about 0.1 mm to about 1 mm and are lubricated with a silicon oil.

3. The process of claim 2 wherein the silicone oil is polydimethylsiloxane.

4. The process of claim 3 wherein the uncured article is a phenolic resin impregnated fiber material cured at a temperature of from about 200° F. to about 400° F. and at a pressure of from about 80 pounds per square inch to about 500 pounds per square inch.

5. The process of claim 3 wherein the uncured article is a glass fiber epoxy impregnated resin which is cured at a temperature of from about 200° F. to about 500° F. and at a pressure of from about 80 pounds per square inch to about 500 pounds per square inch.

6. The process of claim 4 including applying the article to a mold surface prior to placing the article within said pressure chamber wherein said mold surface supports the article during curing.

7. The process of claim 5 including applying the article to a mold surface prior to placing the article within said pressure chamber wherein said mold surface supports the article during curing.

8. A process for heat shaping a thermoplastic polymer article, comprising;

forming a fiber material impregnated with a thermoplastic polymer selected from the group consisting of nylon, acrylic resins, polyetherether ketone, polyamide-imide, polyphenylene sulfide, or styrene-acrylonitrile into an article, placing the article within a cavity of a non-gas-tight pressure chamber, packing lubricated beads under, around and over the article, wherein the beads are selected from the group consisting of metal, ceramic and glass, and shaping the article by applying heat at a temperature of from about 120° F. to about 1,000° F. and by applying at a pressure of from about 100 to about 5,000 pounds per square inch and cooling said article.

9. The process of claim 8 wherein the beads are of glass and have a diameter of from about 0.1 mm to about 1 mm and are lubricated with a silicone oil.

10. The process of claim 9 wherein the silicone oil is polydimethylsiloxane.

* * * * *